(12) United States Patent
Laflamme et al.

(10) Patent No.: US 8,078,191 B2
(45) Date of Patent: Dec. 13, 2011

(54) SYSTEM AND METHOD OF UPDATING PRESENCE INFORMATION

(75) Inventors: Manuel Laflamme, Brossard (CA);
 Sylvain Legault, Pierrefonds (CA); Nick Maiorano, Montreal (CA); Alain Southiere, Montreal (CA)

(73) Assignee: Synchronica plc, Royal Tunbridge Wells (GB)

( * ) Notice: Subject to any disclaimer, the term of this patent is extended or adjusted under 35 U.S.C. 154(b) by 925 days.

(21) Appl. No.: 11/972,079

(22) Filed: Jan. 10, 2008

(65) Prior Publication Data
US 2008/0214170 A1 Sep. 4, 2008

Related U.S. Application Data

(60) Provisional application No. 60/884,299, filed on Jan. 10, 2007.

(51) Int. Cl.
*H04M 3/00* (2006.01)
*H04W 24/00* (2009.01)
*H04W 4/00* (2009.01)
*G06F 3/00* (2006.01)

(52) U.S. Cl. ............... 455/456.1; 455/418; 455/456.5; 455/461; 710/17; 710/19

(58) Field of Classification Search .............. 455/405.2, 455/418, 420, 424–425, 456.1–456.6, 461, 455/466, 514, 517, 550.1, 556.2, 560–561, 455/404.2, 405, 457, 556.1; 710/17–19, 710/104, 220; 370/346; 709/203, 218–219, 709/228
See application file for complete search history.

(56) References Cited

U.S. PATENT DOCUMENTS

| | | | |
|---|---|---|---|
| 6,757,722 B2 | 6/2004 | Lonnfors et al. | |
| 6,993,327 B2* | 1/2006 | Mathis | 455/414.1 |
| 7,526,563 B2* | 4/2009 | Ingimundarson et al. | 709/230 |
| 7,546,127 B2* | 6/2009 | Caspi et al. | 455/456.1 |
| 2002/0129103 A1* | 9/2002 | Birkler et al. | 709/203 |
| 2003/0041101 A1* | 2/2003 | Hansche et al. | 709/203 |
| 2004/0128391 A1* | 7/2004 | Patzer et al. | 709/228 |
| 2005/0074101 A1* | 4/2005 | Moore et al. | 379/114.01 |
| 2005/0086376 A1* | 4/2005 | Park et al. | 709/245 |
| 2005/0135240 A1* | 6/2005 | Ozugur | 370/229 |
| 2005/0144333 A1* | 6/2005 | Kotzin | 710/15 |
| 2005/0213537 A1 | 9/2005 | Ingimundarson et al. | |
| 2005/0232184 A1* | 10/2005 | Borella | 370/328 |
| 2006/0129643 A1* | 6/2006 | Nielson et al. | 709/206 |
| 2006/0148477 A1* | 7/2006 | Reilly | 455/436 |

(Continued)

FOREIGN PATENT DOCUMENTS

EP 1320229 A2 6/2003

(Continued)

OTHER PUBLICATIONS

Extended European Search Report for corresponding EP Application No. 08700506.2 dated Mar. 21, 2011, pp. 1-9.

(Continued)

*Primary Examiner* — Meless Zewdu
(74) *Attorney, Agent, or Firm* — Soquel Group LLC

(57) ABSTRACT

A network node provides presence updates to mobile users. The node reduces the amount of network traffic by eliminating the need for explicit messaging used to inform a user of presence updates. Additionally, the node reduces network traffic by consolidating presence updates, and sending the user only changed portions of the presence information.

28 Claims, 12 Drawing Sheets

U.S. PATENT DOCUMENTS

| | | | |
|---|---|---|---|
| 2006/0149814 A1* | 7/2006 | Borella | 709/204 |
| 2006/0155733 A1* | 7/2006 | John et al. | 707/101 |
| 2007/0032194 A1* | 2/2007 | Griffin | 455/41.2 |
| 2007/0088818 A1 | 4/2007 | Roberts et al. | |
| 2007/0150491 A1* | 6/2007 | Torvinen | 707/100 |
| 2007/0189487 A1* | 8/2007 | Sharland et al. | 379/202.01 |
| 2007/0255577 A1* | 11/2007 | Rao et al. | 705/1 |
| 2007/0266076 A1* | 11/2007 | Cox et al. | 709/203 |
| 2007/0291859 A1* | 12/2007 | Maes | 375/256 |
| 2008/0133738 A1* | 6/2008 | Knauerhase et al. | 709/224 |

FOREIGN PATENT DOCUMENTS

| | | |
|---|---|---|
| EP | 1657944 A1 | 5/2006 |
| WO | 2004/006533 A1 | 1/2004 |
| WO | 2005/104569 A2 | 11/2005 |

OTHER PUBLICATIONS

Korean Office Action for corresponding KR Application No. 2009-7016504 dated Apr. 13, 2011, pp. 1-4.

Open Mobile Alliance, "Client-Server Protocol Session and Transactions," Candidate Version 1.3, Jun. 6, 2006, http://www.openmobilealliance.org/release_program/docs/IMPS/V1_3-20060606-C/OMA-TS-IMPS-CSP-V1_3-20060606-C.pdf.

Open Mobile Alliance, "IMPS Architecture," Candidate Version 1.3, Oct. 11, 2005, http://www.openmobilealliance.org/release_program/docs/IMPS/V1_3-20051011-C/OMA-TS-IMPS-V1_3-20051011-C.pdf.

Open Mobile Alliance, "Presence Attributes," Candidate Version 1.3, Oct. 11, 2005, http://www.openmobilealliance.org/release_program/docs/IMPS/V1_3-20051011-C/OMA-TS-IMPS-PA-V1_3-20051011-C.pdf.

Open Mobile Alliance, "Client-Server Protocol XML Syntax," Candidate Version 1.3, Oct. 11, 2005, http://www.openmobilealliance.org/release_program/docs/IMPS/V1_3-20051011-C/OMA-TS-IMPS-CSP-XMLS-V1_3-20051011-C.pdf.

Rosenberg, et al., Network Working Group, Request for Comments: 3261, "SIP: Session Initiation Protocol," http://www.ietf.org/rfc/rfc3261.txt.

Roach, Network Working Group, Request for Comments: 3265, "Session Initiation Protocol (SIP)—Specific Event Notification," http://www.ietf.org/rfc/rfc3265.txt.

Campbell, et al, Network Working Group, Request for Comments: 3428, "Session Initiation Protocol (SIP) Extension for Instant Messaging," http://www.ietf.org/rfc/rfc3428.txt.

Rosenberg, Network Working Group, Request for Comments: 3856, A Presence Event Package for the Session Initiation Protocol (SIP), http://www.ietf.org/rfc/rfc3856.txt.

Southière, et al, "Presence Model for Presence Service and Method of Providing Presence Information," filed Nov. 27, 2007, assigned U.S. Appl. No. 11/945,294.

\* cited by examiner

SYSTEM AND METHOD OF UPDATING PRESENCE INFORMATION

RELATED APPLICATION

This application claims the benefit of U.S. Provisional Patent Application 60/884,299, filed Jan. 10, 2007, which is incorporated herein by reference.

BACKGROUND

The present invention relates generally to presence services for mobile devices and, more particularly, to updating mobile devices with presence information.

Originally, cellular networks were developed to provide voice services over circuit-switched networks. Although circuit-switched networks are still in widespread use, the current trend is toward packet-switched networks that provide high-speed packet data services in addition to voice services. These high-speed packet data services generally allow mobile users to enjoy the same types of things that Internet users can do on fixed networks.

One such service is instant messaging (IM). Desktop IM has gained widespread acceptance when used in conjunction with fixed networks. Currently, there are more than 100 million registered users of instant messaging services and more than 50 million regular users. Based on that success and adoption rate, wireless service providers may capitalize on the demand for IM services by extending the same services to mobile users. However, wireless service providers face different problems and constraints in offering IM services to mobile providers than do their fixed network counterparts. One such problem, for example, is providing accurate and timely presence notification to mobile users.

Providing accurate presence notifications to mobile users requires communicating presence changes as they occur. However, communicating presence notifications can generate potentially heavy network traffic, and burden precious wireless network resources. Therefore, wireless service providers must balance the need to provide accurate presence notifications to their mobile users with the availability and/or usage of network resources.

SUMMARY

The present invention provides presence update notifications to mobile users, while reducing the amount of network traffic and network resources required to effect the presence updates. According to one embodiment, a network node in a communication network receives presence updates for a client. The network node does not immediately notify the client of the presence updates as is conventional. Rather, the network node stores the presence updates in memory until it receives an explicit request from the client for the presence updates. Upon receipt of a presence update request from the client, the network node sends the stored presence updates to the client.

In some embodiments, the network node may consolidate presence information contained in multiple presence updates into a single consolidated presence update that is sent to the client. More particularly, the network node can accumulate changes in presence attributes and report only the final state for each presence attribute. Moreover, the network node may remember the last reported state for each presence attribute and drop presence attributes from the consolidated update if the final state of the presence attribute is the same as the last reported state.

DETAILED DESCRIPTION

The present invention provides a method and apparatus for providing presence updates to mobile users. According to one embodiment, the present invention reduces the amount of network traffic by eliminating the need for explicit messaging used to inform a user of presence updates. Additionally, the present invention consolidates presence information for the user, and sends the user only the changed portions of the presence information. Therefore, the user obtaining the presence information can autonomously choose when to receive the updates, and receives only the latest information.

Figure 1:
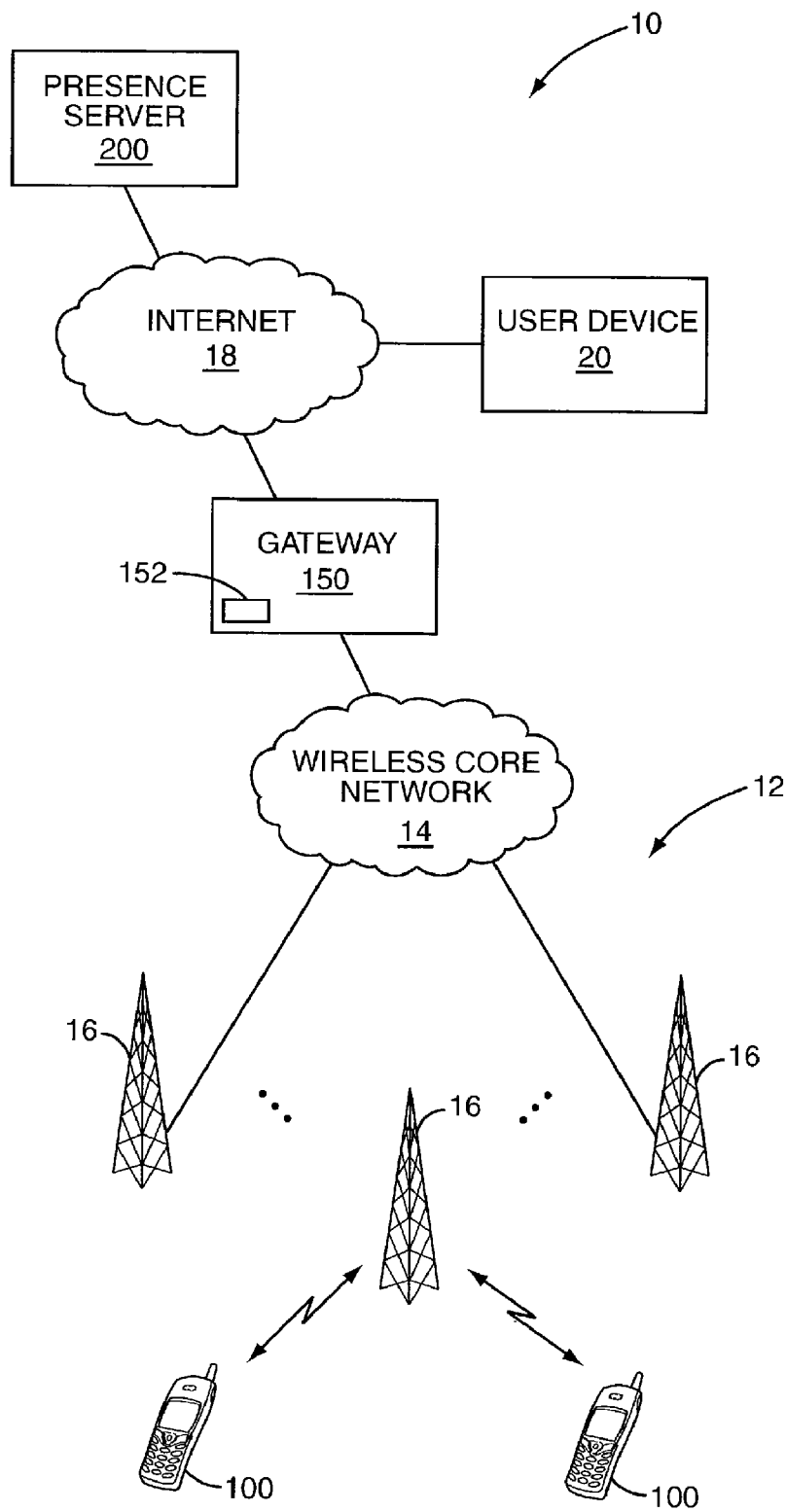
FIG. 1 is a block diagram illustrating a communication network suitable for use according to one embodiment of the present invention.

FIG. 1 illustrates an exemplary network 10 in which the present invention may be used. The network 10 comprises a plurality of mobile devices 100, a wireless access network 12 for communicating with the mobile devices 100, and a wireless core network 14 providing connection to the Internet 18 or other packet data network. The wireless access network 12 preferably comprises a packet-switched network, such as a GPRS, cdma2000, WCDMA, or WiMAX network. The wireless access network 12 includes one or more base stations 16 or other wireless access points. A presence server 200 connects to the Internet 18 and provides instant messaging and presence services to the mobile devices 100. A gateway 150 provides interworking between the wireless core network 14 and the presence server 200.

In one exemplary embodiment, the gateway 150 and presence server 200 are configured according to the Open Mobile Alliance (OMA) standard Instant Messaging Presence Service (IMPS) Architecture "OMS-AD-IMPS-V1_3-20051011-C" dated Oct. 11, 2005. The gateway 150 may communicate messages according to the OMA Client-Server Protocol Session and Transactions standards set forth in "OMA-TS-IMPS-CSP-V1_3-20060606-C" dated Jun. 6, 2006. Both of these documents are incorporated herein by reference in their entirety.

In another embodiment, the presence server 200 may comprise a Session Initiation Protocol (SIP) presence server. In this embodiment, the gateway 150 may include an interworking module 152 to convert messages between IMPS and SIP protocols. An example of a server suitable for this use is described in U.S. Patent Application Publication No. 2005/0213537 entitled "Internetworking Gateway and Method,"

which was filed on Feb. 28, 2005, and which is incorporated herein by reference in its entirety.

The mobile devices 100 have a client module for communicating with the presence server 200. The client is a software application that is executed on a processor and provides support for IMPS services to user applications, such as an instant messaging (IM) application or presence enhanced phone book. The users of the mobile devices 100 register with the presence server 200 for instant messaging and presence services. Once registered, the mobile devices 100 can exchange instant messages, publish presence information, and subscribe to presence updates from other users. Presence update information may, for example, reflect the current availability and/or willingness of a given user to engage in an IM conversation. Users may elect to make their presence status available to other users, and may register to receive presence status updates from other users. Those users that provide or "publish" their presence updates for others are referred to as presentities. Those users that register to receive the presence updates are referred to as watchers. A user can be both a presentity and a watcher.

Conventionally, a client can obtain the presence status of a given presentity by two main methods. The first method is referred to as the subscription method, and the second method is referred to as the fetch method. With the subscription method, a client "subscribes" to receive presence updates for a specified presentity. Whenever the presence status of that presentity changes, the presence server 200 automatically sends a presence update to the client. With the fetch method, the presence server 200 does not automatically send the presence updates when the presence status of the presentity changes. Rather the client must issue an explicit request to the presence server 200 to obtain the current presence status of the presentity.

Figure 2:
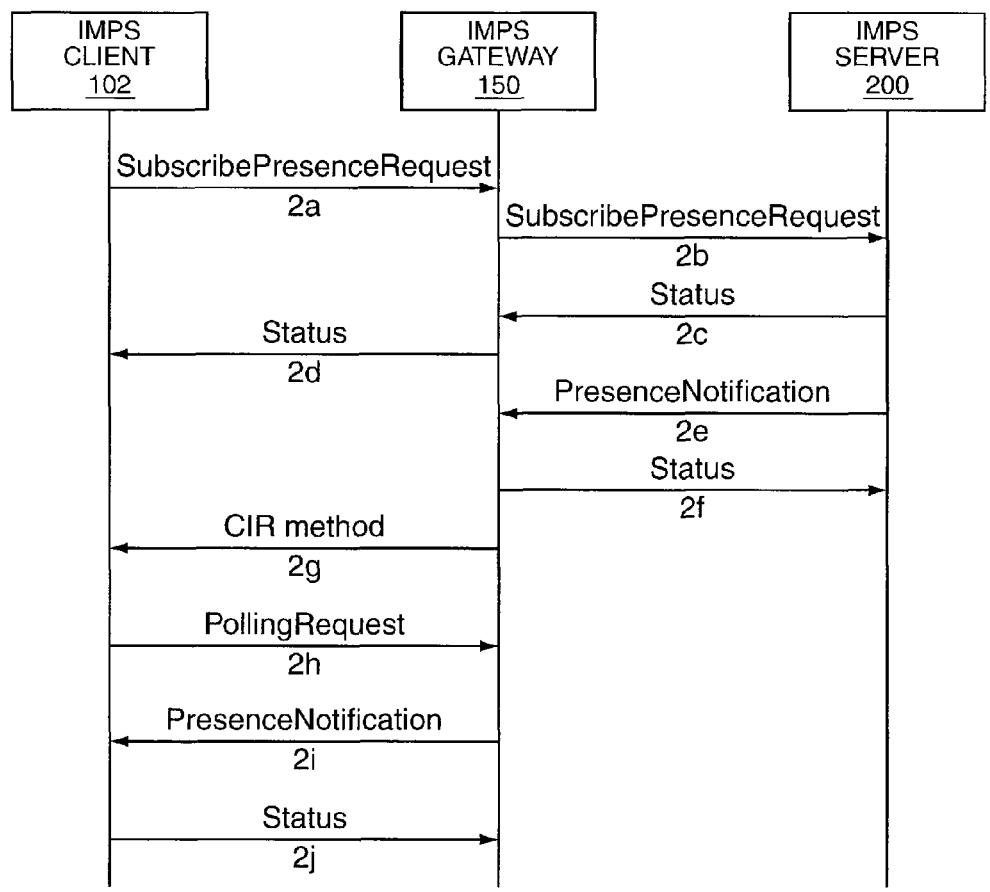
FIGS. 2-5 are call flow diagrams that illustrate presence update notifications according to prior art communication systems and protocols.

FIG. 2 illustrates a conventional subscription method as described in the IMPS standard. In FIG. 2, mobile device 100 includes an IMPS client 102 that communicates with an IMPS-compliant gateway 150. The presence server 200 comprises an IMPS server 200.

Initially, client 102 sends a "SubscribePresenceRequest" message to the gateway 150 (2*a*) to subscribe to presence updates for a specified presentity. The gateway 150 then forwards that request to the presence server 200 in the network (2*b*), which responds to the gateway 150 with a status message confirming that the client 102 has been subscribed to the presentity (2*c*). The gateway 150, in turn, sends a status message to the requesting client 102 to indicate that the client 102 is subscribed to receive presence updates associated with the presentity.

When the presence status of the presentity changes, the presence server 200 sends a "PresenceNotification" message containing updated presence information to the gateway 150 (2*e*). The PresenceNotification message typically includes the updated status for one or more presence attributes of the presentity. By way of example, an attribute may indicate that the presentity is "ON-LINE" or "OFF-LINE," or "IN A MEETING." Other attributes may specify the location of the presentity. Upon receipt, the gateway 150 responds with a status confirmation message to presence server 200 (2*f*), and generates and sends a Communication Initiation Request (CIR) to the client 102 (2*g*) to notify the client 102 that a presence update is pending.

The CIR causes the client 102 to generate and send a "PollingRequest" message to the gateway 150 (2*h*) to request the presence update. The gateway 150 sends a PresenceNotification message containing the presence update (2*i*) and the client 102 responds with a status confirmation message (2*j*).

As described in more detail below, the gateway 150 of the present invention may be configured to eliminate the need for sending this CIR message to explicitly inform the client 102 about the presence updates. This could reduce the amount of network traffic associated with presence updates.

Figure 3:
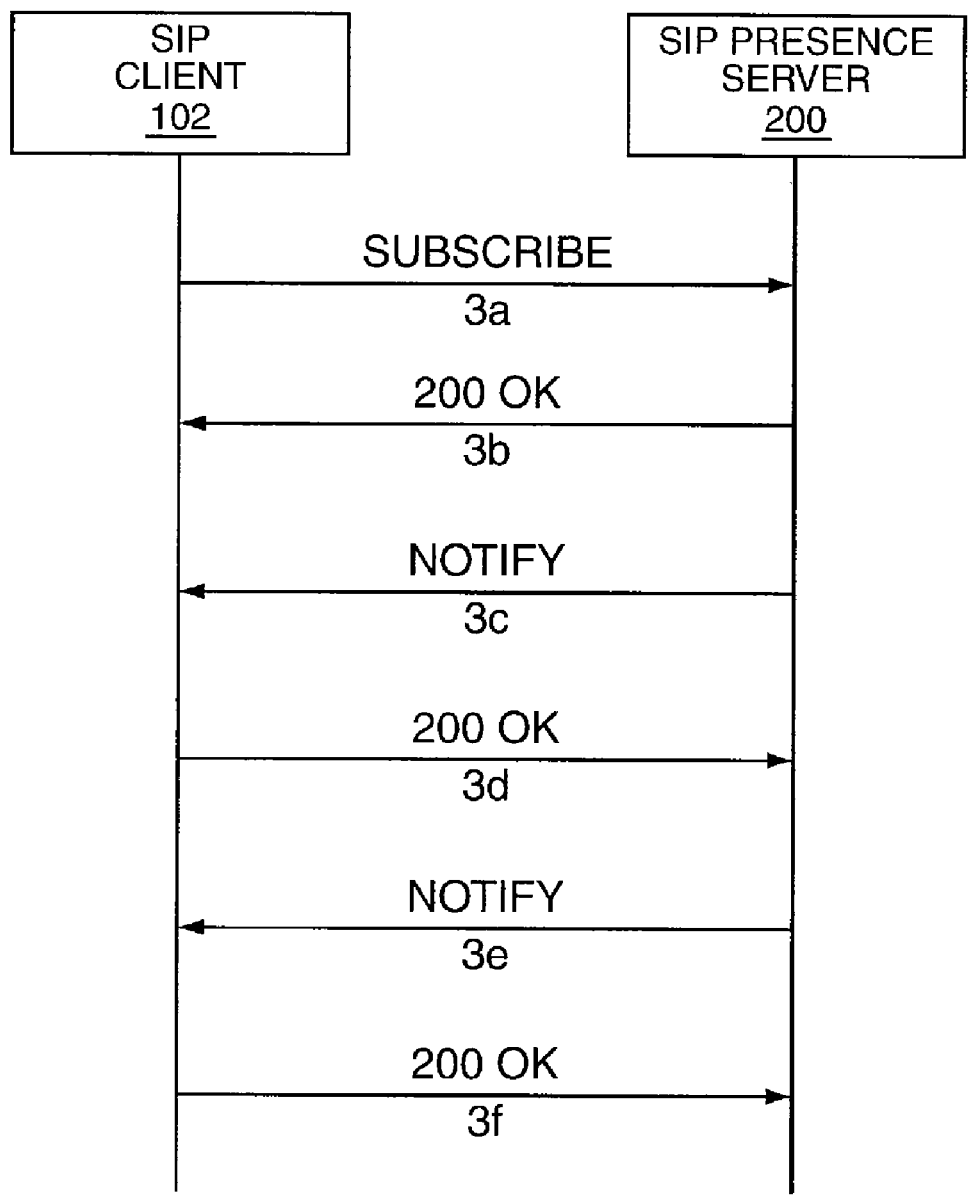

FIG. 3 illustrates another prior-art subscription method to effect presence update notifications using Session Initiation Protocol (SIP). In FIG. 3, the mobile device 100 includes a SIP client 102 and the presence server 200 comprises a SIP presence server 200.

The SIP client 102 initially subscribes to the presentity by sending a SIP SUBSCRIBE message to the presence server 200 (3*a*). The presence server 200 responds to the client 102 with a 200 OK message (3*b*), and sends the client 102 the presence information (3*c*). The client 102 returns a 200 OK message to acknowledge receipt of the information (3*d*). Whenever the presence status of the presentity changes, the presence server 200 notifies the client 102 using a SIP NOTIFY message (3*e*). The client 102 may respond to the notifications using 200 OK messages as is known in the art (3*f*).

Figure 4:
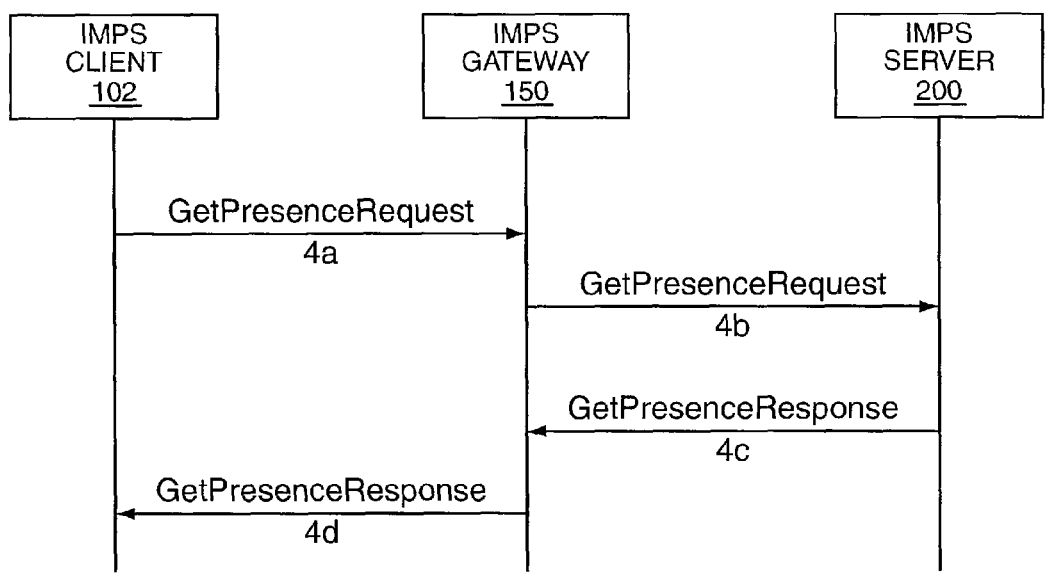
Figure 5:
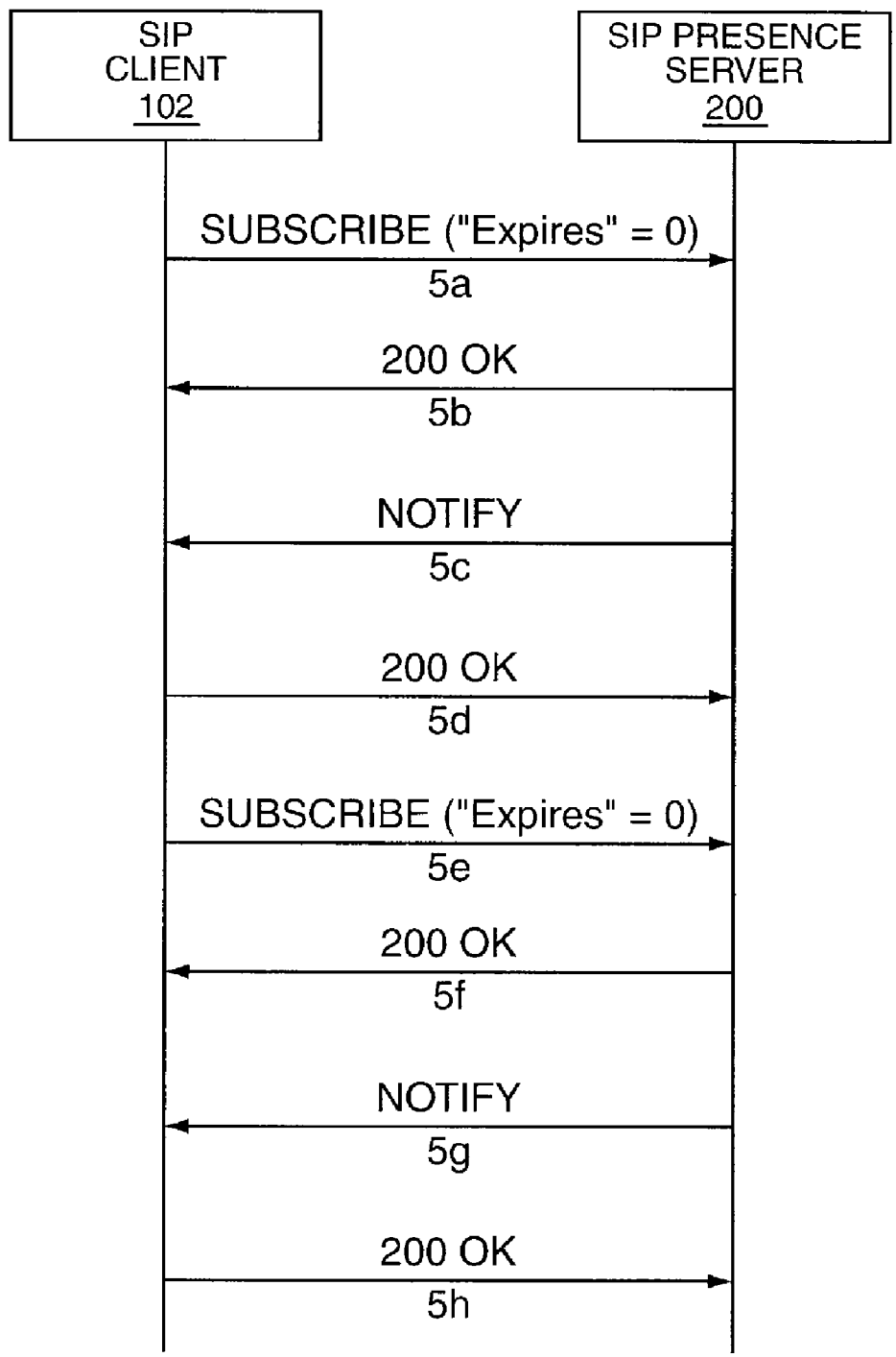

FIGS. 4 and 5 illustrate how conventional fetch methods are used to obtain presence information in different systems. In FIG. 4, which illustrates an IMPS implementation, the client 102 issues an explicit request, such as a fetch command ("GetPresenceRequest"), to request presence information from the presence server 200 (4*a*). Upon receipt, the gateway 150 forwards the GetPresenceRequest message to the presence server 200 (4*b*), which then responds to the client 102 with the updated presence information in a "GetPresenceResponse" message via gateway 150 (4*c*, 4*d*). In this example, the GetPresenceResponse typically includes the current status of all presence attributes whether or not the status has changed.

FIG. 5 illustrates a fetch method as implemented using SIP. In FIG. 5, client 102 sends a SUBSCRIBE message in which the "Expires" parameter is set equal to 0 to fetch current presence information for a presentity (5*a*). The presence server 200 acknowledges the SUBSCRIBE message in a 200 OK message (5*b*) and returns the current presence information to the client 102 in a NOTIFY message (5*c*). The client 102 then returns a 200 OK message to the presence server to acknowledge receipt of the NOTIFY message (5*d*). Thereafter, the presence server 200 responds to subsequent SUBSCRIBE messages from the client 102 with presence information in corresponding NOTFY messages (5*e*-5*g*). As above, the NOTIFY messages returned from the presence server 200 typically include the current status of all presence attributes regardless of whether the status has changed.

Each of the conventional methods in FIGS. 2-5 permits a user to obtain presence update information about a specified presentity. With the subscription methods of FIGS. 2 and 3, the client 102 receives presence updates only when the presence status of the presentity changes. Further, the client 102 receives only the status of the presence attributes that have changed since the last presence update. However, conventional subscription methods send presence updates to the client 102, even in situations where a user might not want to receive presence updates. This increases the amount of network traffic and burdens network resources. Further, some prior-art systems such as the one shown in FIG. 2, use an underlying client-server transport protocol. These conventional systems are required to use explicit messaging such as the previously mentioned CIR messages to inform the client 102 of the pending presence updates.

The conventional fetch methods of FIGS. 4 and 5 address the increased network traffic by sending fetch commands only at specified times. For example, the user of a client 102 device may explicitly request a presence update for a presentity, or the fetch command may be issued responsive to the occurrence of some predetermined trigger or event. While this may reduce network traffic, the presence information at the client 102 may go stale depending upon how often the client 102 "fetches" the presence updates. Further, conventional fetch methods typically provide all presence information to the client 102, even when some or all of the presence information is unchanged from the last requested update or is irrelevant to the client 102. Thus, any reduction in network traffic is tempered by the increased demand for bandwidth when sending all the presence information.

The present invention provides a new method of delivering presence updates that is better suited for mobile devices 100. The present invention eliminates the need to send CIR messages or other explicit messages to clients 102 to inform them of presence updates thus reducing signaling overhead. Rather than immediately send a CIR or other explicit notification to the client 102 as is conventional, the gateway 150 or other network node stores the presence update information in memory until it receives a request for the presence update information from the client 102. If multiple presence updates for a client 102 are received, the gateway 150 may consolidate the presence updates for the client 102. When the client 102 requests a presence update, a consolidated presence update is provided to the client 102.

As one example of a consolidated presence update, consider the scenario in which the gateway 150 receives three presence updates as follows:

| First update: | Attribute1 = A; Attribute3 = X |
|---|---|
| Second update: | Attribute2 = K |
| Third update: | Attribute3 = Y |

In this case, the presence information from the three presence updates is consolidated into a single consolidated presence update as follows:

Consolidated Update: Attribute 1=A; Attribute2=K; Attribute3=Y

The consolidated presence update consolidates the presence information from the three separate presence updates. The consolidation eliminates redundant attributes in the separate presence updates and reports only the final status for any given attribute. More particularly, gateway 150 accumulates state transitions for the attributes to determine the final state for the attributes, and includes only the final state for the attributes in the consolidated presence update. In this example, only the final state for Attribute3 (Attribute3=Y) is included in the consolidated presence update.

In one exemplary embodiment, the last reported state for each presence attribute is remembered. When a presence update is requested, the status of each presence attribute in the consolidated presence update is compared to the last reported state and is dropped from the consolidated presence update if the current state is the same as the last reported state. Thus, the consolidated presence update reports the status of presence attributes that have changed. As an example of this approach, consider the scenario in which the last reported state for the presentity is as follows:

Attribute1=A; Attribute2=K; Attribute3=X

The gateway 150 then receives three presence updates as follows:

| First update: | Attribute1 = B; Attribute3 = Y |
|---|---|
| Second update: | Attribute2 = L; |
| Third update: | Attribute3 = X |

In this case, the presence information from the three presence updates is consolidated into a single consolidated presence update as follows:

Consolidated Update: Attribute1=B; Attribute2=L

The current status for Attribute3 is not included in the consolidated presence update sent to the client 102 because the final state for Attribute3 is the same as the last reported state.

Figure 6:
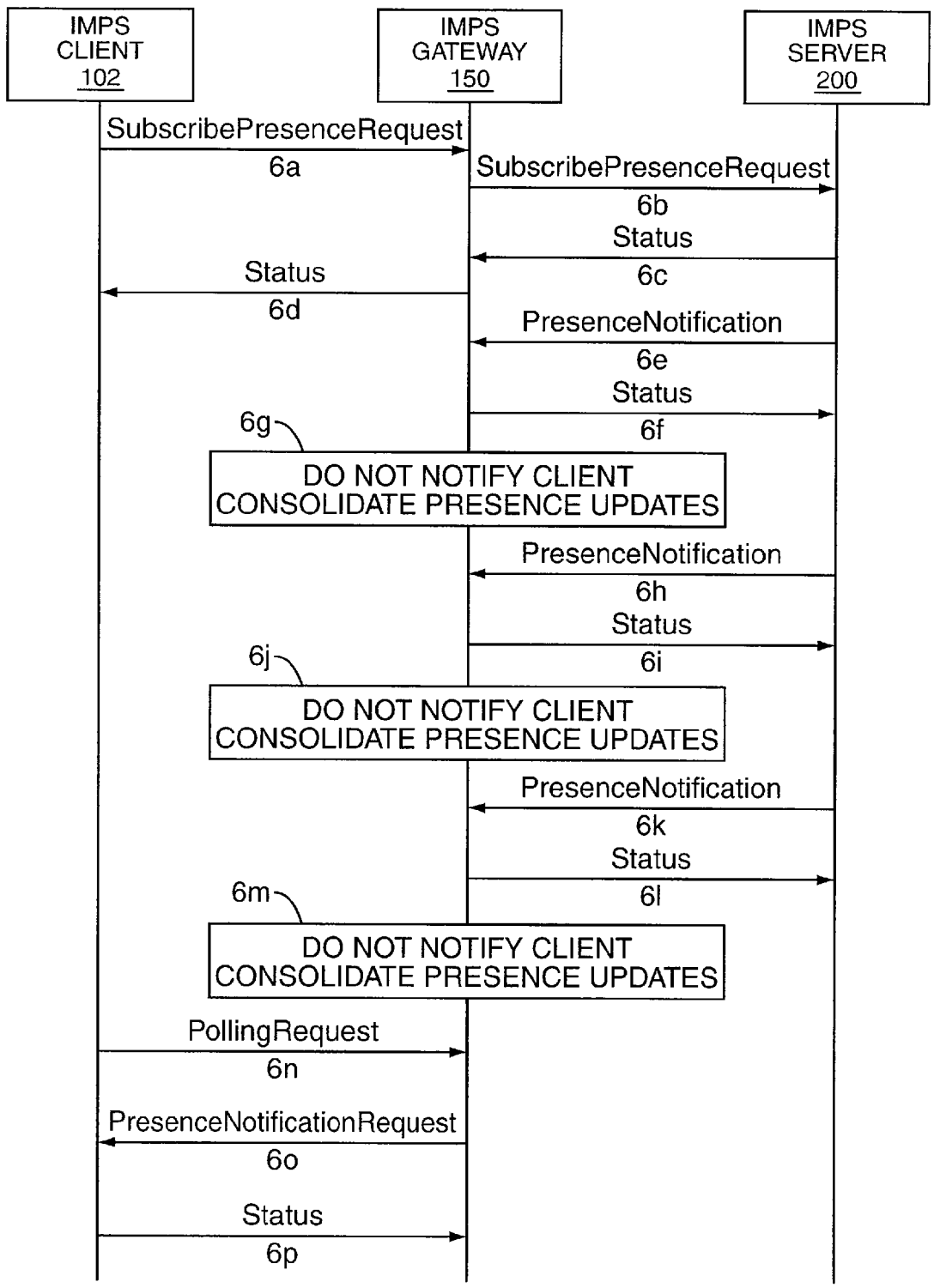
FIG. 6 illustrates a presence update notification call flow according to one embodiment of the present invention.

FIG. 6 illustrates one exemplary embodiment of the present invention in which the client 102 uses the subscription method to obtain presence updates. In this embodiment, the client 102 comprises an IMPS-compatible client 102 that communicates with an IMPS gateway 150. The presence server 200 is an IMPS server that provides presence and IM services to the IMPS client 102. Initially, the client 102 sends a "SubscribePresenceRequest" message to subscribe to receive presence updates for a particular presentity (6a). The gateway 150 then forwards that message to the presence server 200 and receives an acknowledgment that is returned to the client 102 (6b-6d).

Whenever the presence status of the presentity changes, the presence server 200 automatically sends the presence updates in "PresenceNotification" messages to the gateway 150, which responds with corresponding status confirmation messages (6e-6f, 6h-6i, 6k-6l). The PresenceNotification messages include the presence attributes as previously mentioned. Rather than immediately send a CIR or other explicit notification to the client 102 as is conventional, however, the gateway 150 stores the presence updates in memory until it receives an unsolicited request for the presence updates from the client 102. If multiple presence updates are received from the presence server 200, gateway 150 consolidates the presence updates using one of the methods described above (boxes 6g, 6j, 6m). The gateway 150 maintains the consolidated update information until it receives an explicit request from the client 102, such as a "PollingRequest" (6n). Upon receipt, the gateway 150 sends the consolidated presence update to the client 102 as previously described (6o, 6p).

The gateway 150 may determine which presence attributes have changed from the last state reported to the client 102 using any method known in the art. In one embodiment, for example, the gateway 150 remembers the state of each attribute as it was last reported to the client 102. The gateway 150 indicates the attributes that change from that "remembered" state by setting a flag associated with the changed attribute. For example, the gateway 150 may set a flag associated with a particular attribute to "TRUE" when the presentity goes from ON-LINE to OFF-LINE. Likewise, the gateway 150 may add a new attribute not previously reported to the client 102, and set a flag associated with the new attribute to "TRUE." Those attributes stored at the gateway 150 that remain unchanged between presence updates may have flags that remain set to "FALSE." If an attribute currently marked as changed reverts to its original state (e.g., if the presentity goes back ON-LINE), the flag associated with that attribute is re-set to "FALSE" because the final state for that attribute is the same as the last state reported to the client. When the client 102 requests the presence update, the gateway 150 may only send those attributes having a flag set to "TRUE" to the client 102. Therefore, the client 102 receives only the attributes having values that differ from those it last received from the gateway 150. Upon receipt by the client 102, the gateway may reset the flags to "FALSE" and continue to consolidate the updated information.

Figure 7:
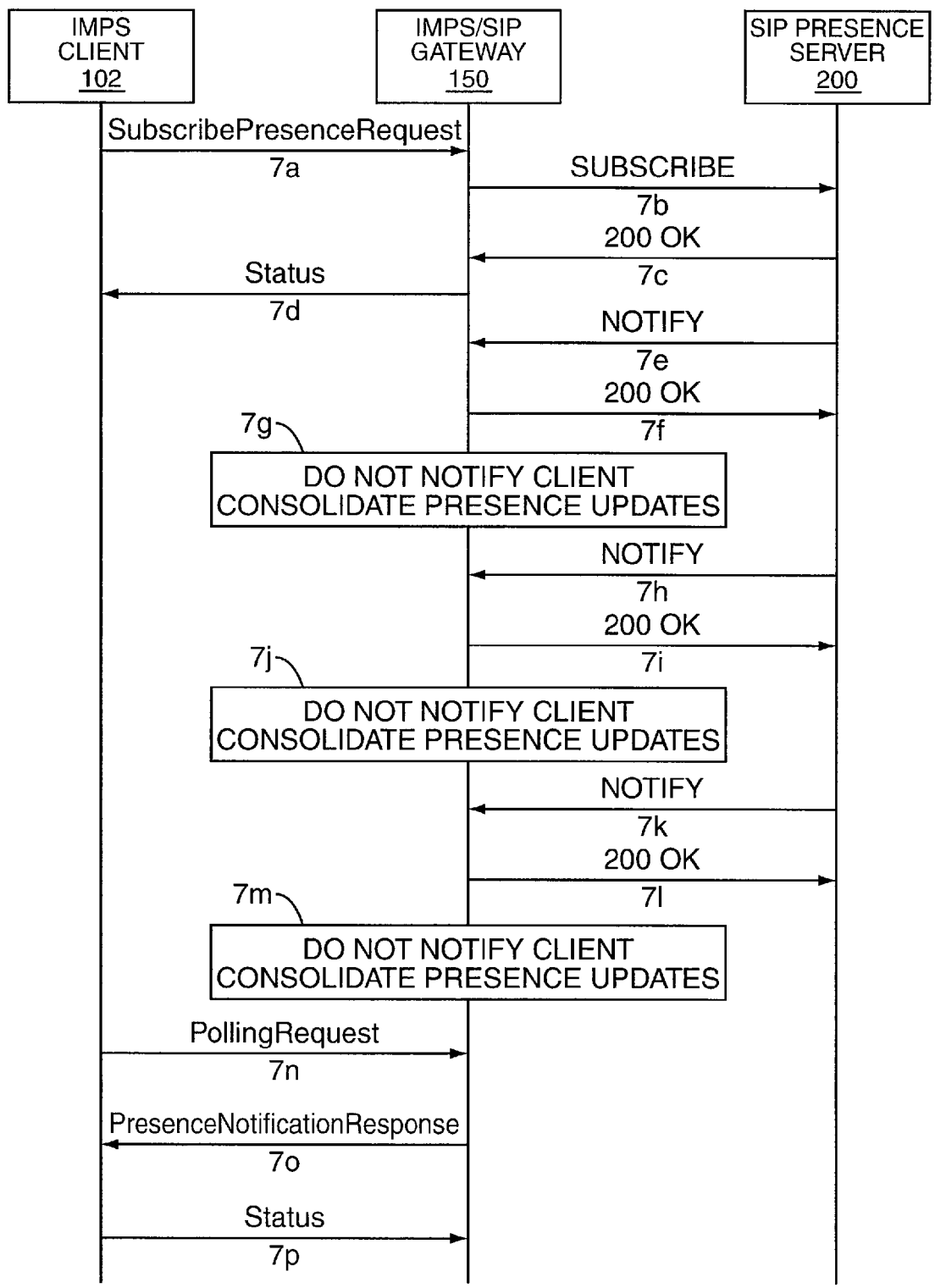
FIG. 7 illustrates a presence update notification call flow according to another embodiment of the present invention.

FIG. 7 illustrates another embodiment of the present invention wherein the mobile device 100 comprises an IMPS client 102, and the presence server 200 comprises a SIP presence server. The gateway 150 comprises an interworking IMPS/SIP gateway having the interworking module 102. The interworking module 102 converts data across IMPS and SIP to permit the IMPS client 102 to receive IM and presence services from the SIP presence server 200. In this example, the client 102 also uses a subscription method to obtain presence updates.

The client 102 initially sends an IMPS SubscribePresenceRequest to the gateway 150 to subscribe to a given presentity (7a). The gateway 150 then sends a corresponding SIP SUBSCRIBE message to the presence server 200 (7b). The presence server 200 responds with a SIP 200 OK message to the gateway 150, which responds to the client 102 with an IMPS Status confirmation message (7d). Thereafter, the presence server 200 sends presence updates to the gateway 150 whenever the presence status of the presentity changes (7e-7f, 7h-7i, 7k-7l).

In accordance with the present invention, the gateway 150 does not send a CIR or other explicit notification to inform the client 102 of the presence updates. Instead, the gateway 150 consolidates the presence update notifications as previously described (7g, 7j, 7m). To receive the presence updates, the client 102 sends an IMPS "PollingRequest" message to the gateway 150 (7n). The gateway 150 then sends the consolidated presence update to the client 102 in a "PresenceNotificationRequest" message (7o, 7p).

Figure 8:
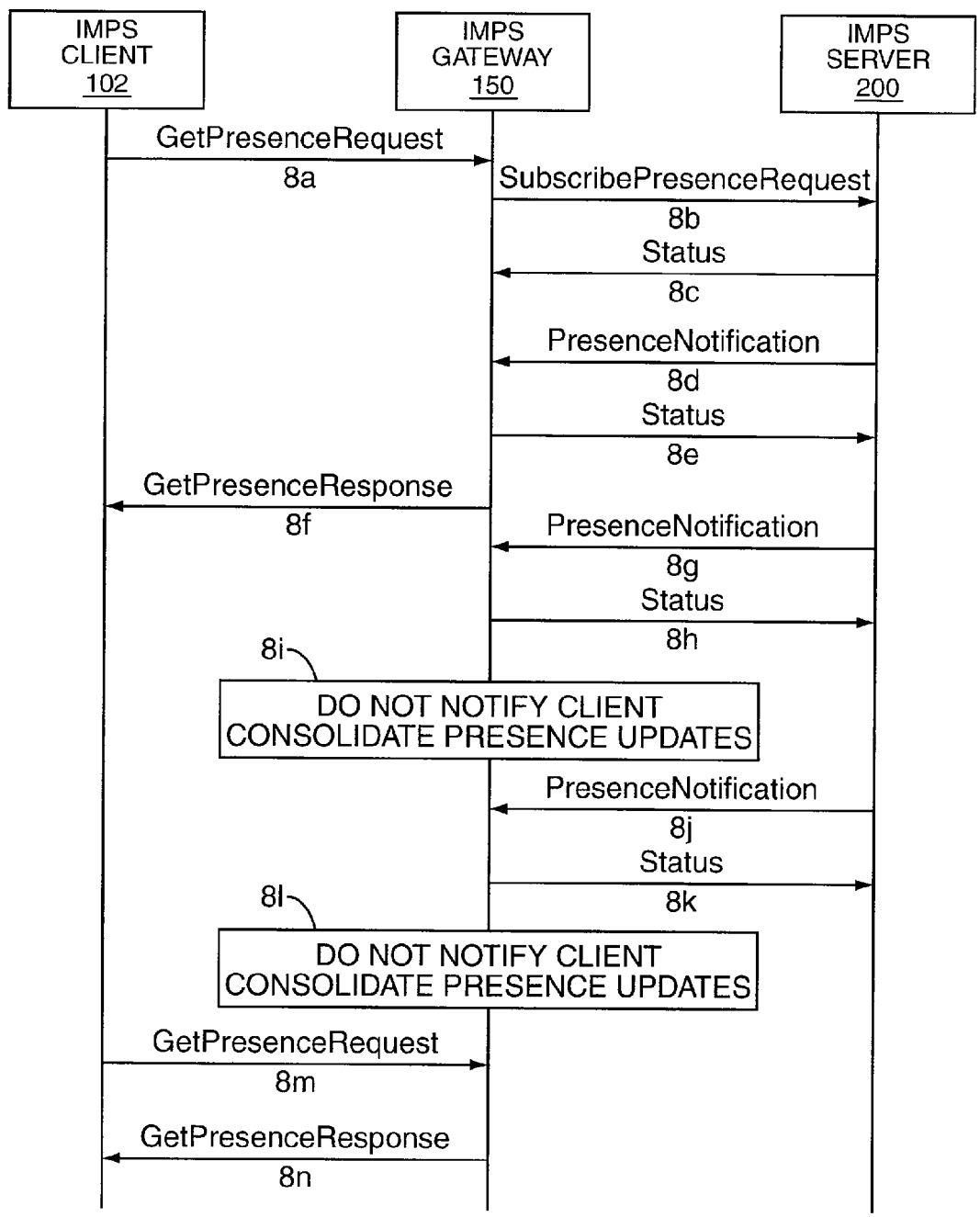
FIG. 8 illustrates a presence update notification call flow according to another embodiment of the present invention.

FIG. 8 illustrates an embodiment of the present invention wherein the client 102 employs a fetch method to obtain presence information for a presentity. In FIG. 8, the mobile device 100 comprises an IMPS client 102 that communicates with an IMPS gateway 150. An IMPS presence server 200 provides presence and IM services to the IMPS client 102. Initially, the client 102 sends a GetPresenceRequest message to the presence server 200 via the gateway 150 (8a), which then sends a SubscribePresenceRequest message to subscribe to the presence server 200 (8b-8c). Thereafter, the gateway 150 receives a presence update from the presence server 200 in a PresenceNotification message (8d-8e), and forwards the presence update information to the client 102 in a GetPresenceResponse message (8f).

Whenever the gateway 150 receives subsequent presence updates in subsequent PresenceNotification messages from the presence server 200 (8g-8h, 8j-8k), the gateway 150 does not immediately notify the client 102. Rather, the gateway 150 consolidates the presence updates as previously described (8i, 8l). When the gateway 150 receives an unsolicited GetPresenceRequest message from the client 102 (e.g., a fetch command), the gateway 150 sends the consolidated presence update in a GetPresenceResponse message (8m, 8n).

Figure 9:
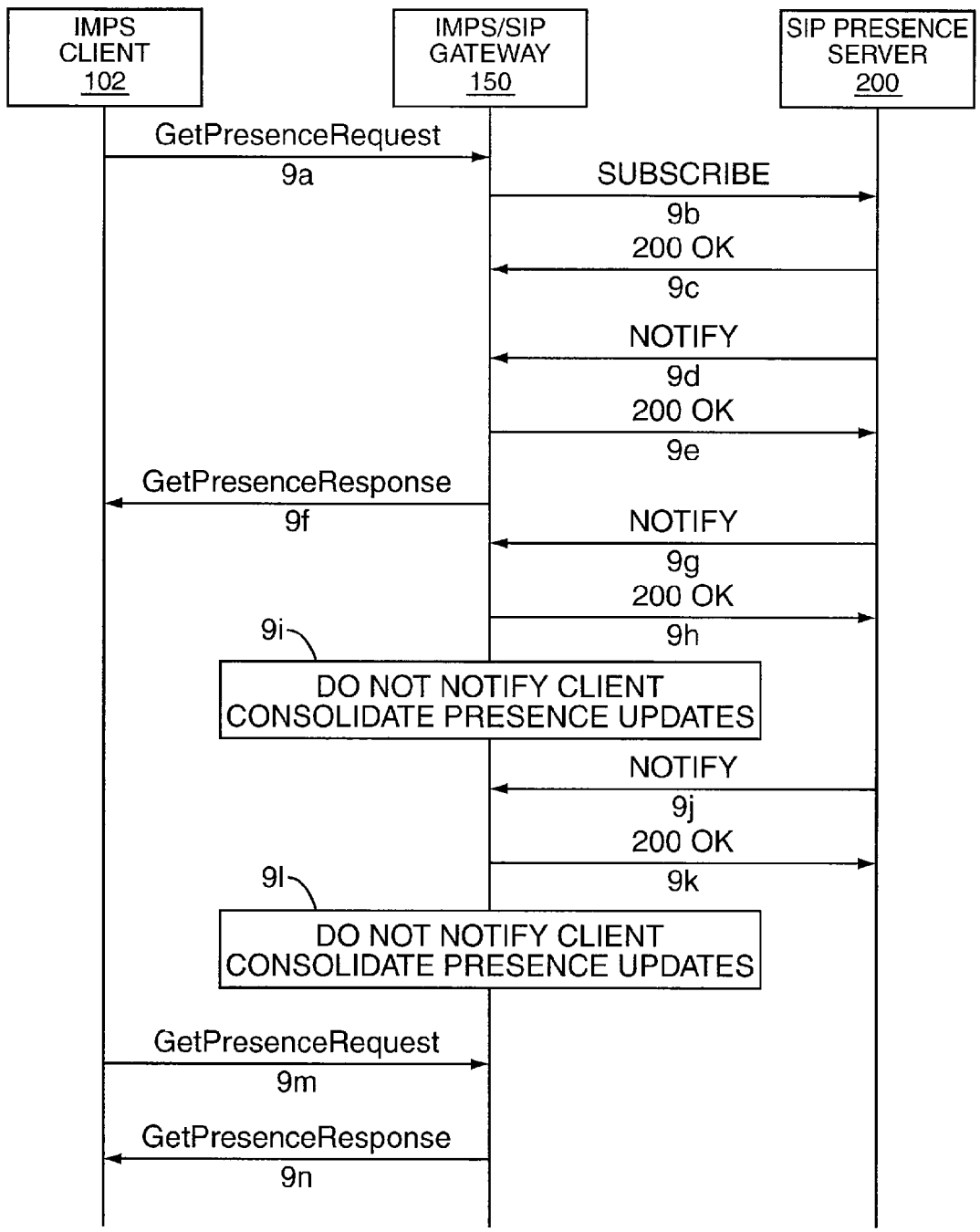
FIG. 9 illustrates a presence update notification call flow according to another embodiment of the present invention.

FIG. 9 illustrates another embodiment of the present invention that employs a fetch method to obtain presence updates. In FIG. 9, the gateway 150 comprises an interworking IMPS/SIP gateway that converts data across IMPS and SIP and facilitates the IMPS client 102 receiving IM and presence services from a SIP presence server 200. In FIG. 9, the gateway 150 receives an IMPS "GetPresenceRequest" message from the client 102 (9a), and sends a SIP SUBSCRIBE message to the presence server 200. The presence server 200 may respond with an appropriate confirmation message as is known in the art (9c). The presence server 200 then sends the gateway 150 a NOTIFY message that includes the presence update information (9d). After acknowledging receipt (9e), the gateway 150 sends the client 102 the presence updates in a GetPresenceResponse message (9f).

Thereafter, the gateway 150 receives subsequent presence updates from the presence server 200 in subsequent NOTIFY messages (9g, 9j). The gateway 150 may acknowledge receipt of the NOTIFY messages (9h, 9k), but does not send an explicit notification to inform the client 102 of the presence updates. Rather, the gateway 150 consolidates the presence updates (9i, 9l). The client 102 may then send an unsolicited GetPresenceRequest message (9m) to the gateway 150 to request the presence updates. The gateway 150 then sends the consolidated presence update to the client 102 in a GetPresenceResponse message (9n).

Figure 10:
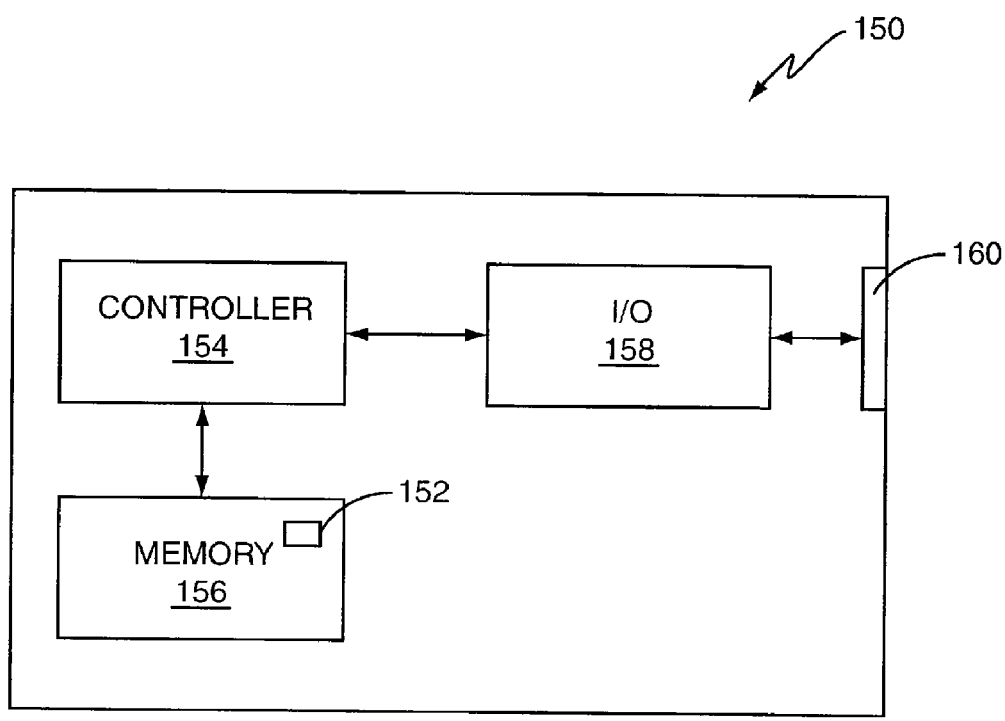
FIG. 10 is a block diagram illustrating some of the component parts of a network node configured to operate according to one embodiment of the present invention.

FIG. 10 is a block diagram that illustrates some of the functional components of the gateway 150 configured according to one embodiment of the present invention. As seen in FIG. 10, the gateway 150 comprises a controller 154, memory 156, and Input/Output (I/O) circuit 158, and a communication port 160 to communicate with remote entities, such as mobile device 100, via the Internet 18 and/or other communication network. In some embodiments, the gateway 150 includes the interworking module 152 in memory 156 to facilitate cross-protocol communication.

Controller 154 may comprise one or more microprocessors, and controls the gateway 150 according to instructions and data stored in memory 156. According to the present invention, such instructions include the logic necessary to refrain from sending CIRs or other explicit messages to a client 102 whenever gateway 150 receives presence updates from presence server 200 via port 160. For example, the logic may configure the controller 154 not to send a CIR whenever it receives a subscription or fetch request message from a client 102. The instructions also include the logic necessary to cause the controller 154 to consolidate the presence updates as previously stated. This includes, but is not limited to, overwriting and/or accumulating changed presence attributes based on corresponding presence attributes received with the presence updates, and adding new presence attributes not maintained by gateway 150.

Figure 11:
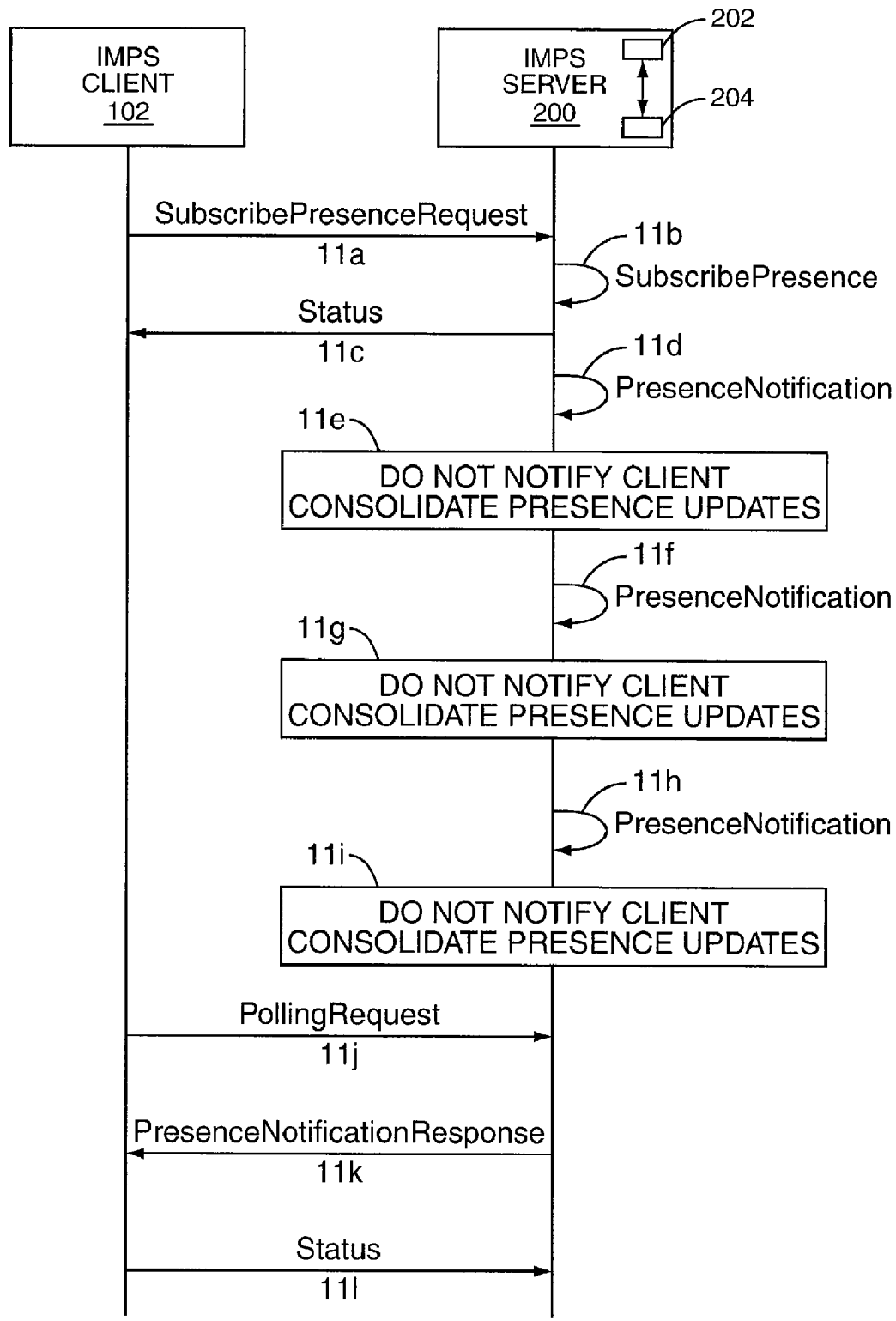
FIGS. 11 and 12 illustrate presence update notification call flows according to alternate embodiments of the present invention.
Figure 12:
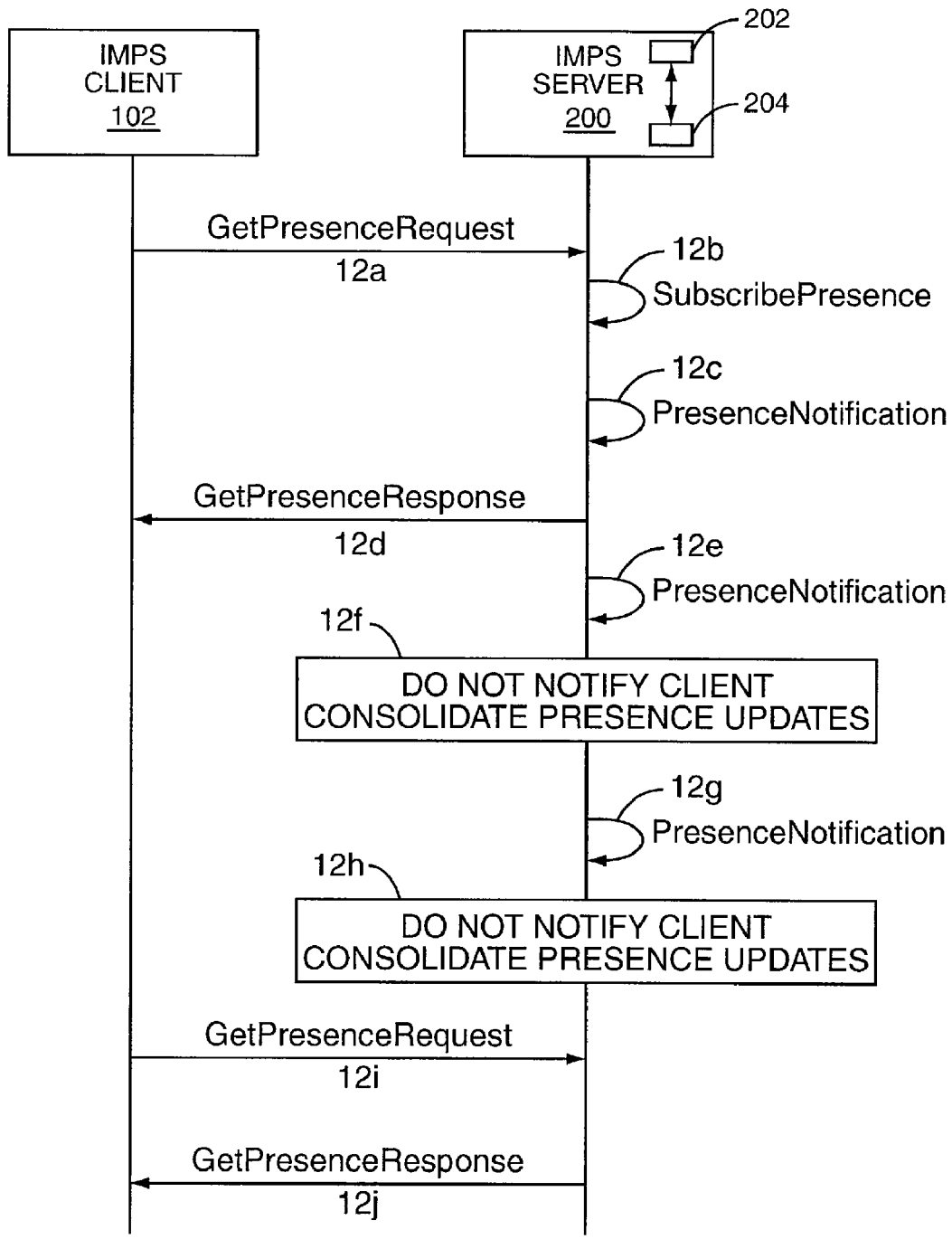

Those skilled in the art should appreciate that the present invention is not limited to being implemented in a gateway or other server that communicatively connects a client to another remote presence server. FIGS. 11-12, for example, illustrates alternate embodiments wherein the presence server 200 provides the IM services, the presence services, and the presence updates to the client 102 according to the present invention. Particularly, presence server 200 may include presence logic 202 for effecting presence services, and update notification logic 204 for effecting presence updates according to the present invention. The two logic modules 202, 204 may communicate with each other using inter-process communication (IPC) to perform the functionality of the present invention.

FIG. 11 illustrates an embodiment where the mobile device 100 comprises an IMPS client 102 that receives IM and presence services from an IMPS presence server 200. In this embodiment, the presence server 200 includes functional components similar to that of FIG. 10.

Initially, the client 102 sends a SubscribePresenceRequest to the presence server 200 to subscribe to receive presence updates. After subscribing the client 102, the presence server 200 returns a Status message to the client 102 (11a-11c). Whenever the presentity's status changes (11d, 11f, 11h), the presence logic 202 does not send a CIR or other explicit notification to the client 102. Rather, the presence logic 202 causes the controller 154 to generate and send control signals to the update notification logic 204. Responsive to the control signals, the update notification logic 204 consolidates the update information into a consolidated presence update as previously described (11e, 11g, 11i). Upon receiving a PollingRequest message from the client 102, the presence server 200 sends the consolidated presence update to the client 102 in a PresenceNotificationResponse message (11k-11l).

FIG. 12 illustrates an embodiment that uses a fetch method to receive presence updates. In FIG. 12, the client 102 sends a GetPresenceRequest message to the presence server 200 (12a). Upon receipt, the presence server 200 subscribes the client 102 to receive presence updates (12b). The presence logic 202 sends a PresenceNotification message to the update notification logic 204 (12c), which then sends the client 102 the presence information in a GetPresenceResponse message (12d). Thereafter, whenever the presence logic 202 receives an indication of a presence change for the presentity, it sends PresenceNotification messages to the update notification logic 204 (12e, 12g). The update notification logic 204 does not sent the client an explicit notification to inform the client 102 of the presence updates, but instead, consolidates the presence updates as previously described (12f, 12h). Upon receiving subsequent GetPresenceRequest messages from the client 102 (12i), the update notification logic 204 sends the consolidated presence update to the client 102 in a GetPresenceResponse (12j).

The embodiments herein describe the present invention in the context of the client 102 obtaining presence update information for a single presentity. However, this is for illustrative purposes only. Those skilled in the art will appreciate that the present invention may provide presence updates to client 102 for multiple presentities.

Particularly, a client 102 may subscribe to and/or fetch presence information for multiple presentities. In such cases, the gateway 150 would receive the presence updates for each presentity. Rather than explicitly notify the client 102 of each presence update, the gateway 150 or other network node would consolidate the presence updates for each presentity until it receives a request for the presence update information from the client 102. Upon receiving that request, the gateway 150 would send a consolidated presence update to the client that includes presence update information for multiple presentities.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for updating presence information, comprising:
   consolidating, at a processor, presence updates received from a presence server to create a consolidated presence update that specifies cumulatively presence attributes associated with the presence updates;
   determining to send the consolidated presence update to a client responsive to receiving an unsolicited client request for presence information;
   determining a last reported state for said presence attributes;
   comparing a final state of each presence attribute to the last reported state; and
   selectively including presence attributes in the consolidated presence update based on the comparison;
   wherein consolidating presence updates includes accumulating state transitions for one or more presence attributes to determine the final state for each presence attribute, and also includes only a final state for said presence attributes in the consolidated presence update.

2. The method of claim 1 wherein the unsolicited client request comprises a fetch request.

3. The method of claim 1 wherein the unsolicited client request comprises a polling request.

4. The method of claim 1 further comprising subscribing to receive the presence updates for the client in response to the client request.

5. The method of claim 4 wherein the subscription is responsive to a subscription request from the client.

6. The method of claim 4 wherein the subscription is responsive to a fetch request from the client.

7. An apparatus for updating presence information, comprising:
   at least one processor; and
   at least one memory including computer program instructions stored as program code thereon,
   the at least one memory and the computer program code configured to, with the at least one processor, cause the apparatus to perform at least the following:
   receive a client request for the presence information;
   consolidate presence updates received from a presence server to create a consolidated presence update that specifies cumulatively presence attributes associated with the presence updates;
   receive an unsolicited client request for the presence information;
   determine to send the consolidated presence update to the client responsive to the unsolicited client request;
   accumulate state transitions for one or more presence attributes to determine a final state for said presence attributes;
   include only the final state for said presence attributes in the consolidated presence update;
   determine a last reported state for said presence attributes;
   compare a final state of each presence attribute to the last reported state for the presence attributes; and
   selectively include the presence attributes in the consolidated presence update based on the comparison.

8. The apparatus of claim 7 wherein the unsolicited client request comprises a fetch request.

9. The apparatus of claim 7 wherein the unsolicited client request comprises a polling request.

10. The apparatus of claim 7 wherein the processor is further configured to subscribe to receive the presence updates for the client in response to the client request.

11. The apparatus of claim 10 wherein the subscription is responsive to receiving a fetch request from the client.

12. The apparatus of claim 10 wherein the subscription is responsive to receiving a subscription request from the client.

13. The apparatus of claim 7 wherein the processor is further configured to add new presence attributes to the consolidated presence update.

14. A method for updating presence information, comprising:
   accumulating, at a processor, state transitions for one or more presence attributes of a presentity to determine a final state for the presence attributes;
   determining to send a consolidated presence update to a client, the consolidated presence update including only the final state for said presence attributes;
   determining a last reported state for the presence attributes;

comparing a final state of each presence attribute to the last reported state for the presence attributes; and selectively including presence attributes in the consolidated presence update based on the comparison.

15. The method of claim 14 further comprising receiving an unsolicited client request for the presence information and wherein sending the consolidated presence update to the client is responsive to the unsolicited client request.

16. The method of claim 15 wherein the unsolicited client request comprises a fetch request.

17. The method of claim 15 wherein the unsolicited client request comprises a polling request.

18. The method of claim 14 further comprising subscribing to receive the presence updates for the client in response to a request from the client.

19. The method of claim 18 wherein the subscription is responsive to a subscription request from the client.

20. The method of claim 18 wherein the subscription is responsive to a fetch request from the client.

21. An apparatus for updating presence information, comprising:
   at least one processor; and
   at least one memory including computer program instructions stored as program code thereon,
   the at least one memory and the computer program code configured to, with the at least one processor, cause the apparatus to perform at least the following:
   receive a client request for presence information;
   accumulate state transitions for one or more presence attributes of a presentity to determine a final state for the presence attributes;
   determine to send a consolidated presence update to the client, the consolidated presence update including only the final state for said presence attributes;
   remember a last reported state for the presence attributes;
   compare a final state of each presence attribute to the last reported state for the presence attributes; and
   selectively include the presence attributes in the consolidated presence update based on the comparison.

22. The apparatus of claim 21 wherein the client request for presence information comprises an unsolicited client request for the presence information, and wherein the processor is configured to send the consolidated presence update to the client responsive to receiving the unsolicited client request.

23. The apparatus of claim 22 wherein the unsolicited client request comprises a fetch request.

24. The apparatus of claim 22 wherein the unsolicited client request comprises a polling request.

25. The apparatus of claim 21 wherein the processor is further configured to subscribe to receive the presence updates for the client in response to the client request.

26. The apparatus of claim 25 wherein the subscription is responsive to receiving a fetch request from the client.

27. The apparatus of claim 25 wherein the subscription is responsive to receiving a subscription request from the client.

28. The apparatus of claim 21 wherein the processor is further configured to add new presence attributes to the consolidated presence update.

* * * * *